UNITED STATES PATENT OFFICE.

ROBERT A. FISHER, OF PHILADELPHIA, PENNSYLVANIA.

MANUFACTURE OF A SIZING MATERIAL FOR PAPER-MAKERS' USE.

SPECIFICATION forming part of Letters Patent No. 321,095, dated June 30, 1885.

Application filed May 1, 1885. (No specimens.)

*To all whom it may concern:*

Be it known that I, ROBERT A. FISHER, of the city and county of Philadelphia, State of Pennsylvania, have invented a new and useful Improvement in the Manufacture of a Sizing Material for Paper-Makers' Use, of which the following is a full, clear, and exact description.

My invention consists in the production (directly from artificial hydrate of alumina) of a porous sulphate of alumina containing magnesia, but free from iron and excess of alumina or acid, in fact, so "neutral" that an aqueous solution of the same will not alter the color of the artificial ultramarine-blue used in the manufacture of paper.

The production of a compound of sulphuric acid and alumina having a porous or vesicular structure, made by the chemical reaction of hydrated alumina and sulphuric acid, is not new. Henry Pemberton, of Allegheny city, Pennsylvania, has obtained a patent (No. 82,747) for the production of such a substance; but there is difficulty in obtaining a pure sulphate of alumina entirely soluble in water and yet so neutral that an aqueous solution of the same will not affect the color of ultramarine-blue. If an excess of alumina be employed, the result will be a neutral or basic sulphate of alumina; but owing to the excess of alumina the compound is not completely soluble in water. On the other hand, if an excess of acid be employed, although a compound completely soluble in water is obtained, it contains more or less "free" acid, the effect of which is to injure the color of the ultramarine-blue used in the manufacture of paper. By my invention there can be uniformly produced a "porous alum" perfectly soluble in water, and yet so neutral that it will not injure the color of paper-makers' ultramarine-blue.

The following is the method of carrying out my invention, viz: In a suitable vessel mix wet or moist hydrate of alumina free from iron with sulphuric acid and water, in about the following proportions: say, three hundred pounds (300 lbs.) of wet or moist hydrate of alumina containing one hundred and three pounds (103 lbs.) anhydrous alumina with four hundred pounds (400 lbs.) (more or less) of sulphuric acid of density 58° Baumé. These proportions are designed to be one hundred and three parts, by weight, of anhydrous alumina ($Al_2O_3$) and about two hundred and forty-one (241) parts, by weight, of anhydrous sulphuric acid, ($SO_3$,) in order to form a compound of sulphate of alumina and water having the chemical formula $Al_2O_3 3SO_3 + 18HO$, with a very slight excess of sulphuric acid, the amount of water in sulphuric acid of 58° Baumé (allowing for the escape of the same in the form of steam during the process) being enough to supply the water required in the finished product. It is therefore evident that if the moist hydrate of alumina should contain more anhydrous alumina and, consequently, less water than named above, (sixty-four to sixty-five per cent. of water,) more water will be required than is contained in sulphuric acid having the density of 58° Baumé; and still more water must be used if the hydrate of alumina should contain sixty per cent. to sixty-five per cent. of anhydrous alumina. Soon after mixing the hydrate of alumina and sulphuric acid there begins a powerful chemical reaction, attended by a great evolution of heat and the formation and escape of steam. After the chemical action has ceased, there remains a very slight excess of sulphuric acid. Therefore, the next step in my process is to neutralize this free acid. This I accomplish by adding to the hot fluid mass of sulphate of alumina a natural or artificial oxide or carbonate of magnesium in fine powder, either dry or mingled with a small quantity of water. The amount of neutralizing material to be used will depend upon the amount of free acid contained in the sulphate of alumina. One pound of oxide or carbonate of magnesium to one hundred pounds of the porous sizing material to be produced may more than suffice. Practice will determine about the amount required to obtain a product that will not affect the color of paper-makers' ultramarine-blue.

I do not confine myself to the use of magnesia to neutralize the free acid in the hot fluid sulphate of alumina. Metallic zinc and the oxide or carbonate of zinc and some other compounds of zinc will effect this object without diminishing the sizing power of the product; but I prefer to use a compound of magnesium. After having added and thoroughly stirred into the hot fluid sulphate of alumina the required amount of magnesia or other neutralizing material, the next step in my process is to bring the now neutral or "basic" fluid into the condition of a solid substance filled with pores or vesicles. To accomplish this, I allow the fluid to cool, either with or without stirring, until it begins to thicken, when a small quantity of bicarbonate of soda in fine powder, in the proportion of two (2) pounds (more or less) to one thousand pounds of the substance to be produced, is sprinkled upon the surface and stirred rapidly into the mass, which, when thoroughly mixed and sufficiently cool, is discharged into a suitable receptacle to harden, and, finally, is broken up into lumps of the desired size.

Instead of adding oxide or carbonate of magnesia or other neutralizing substance to the hot fluid sulphate of alumina prior to adding the bicarbonate of soda or other substance mentioned to produce porosity, the oxide or carbonate of magnesium or other neutralizing material may be first intimately mixed with the bicarbonate of soda or other bicarbonate or carbonate, and this mixture then sprinkled upon and thoroughly stirred into the sulphate of alumina after it has partially cooled and begun to thicken in the same manner as above described when using a bicarbonate or carbonate alone; but I prefer to use the neutralizing material separately, as above set forth.

The desired porous or vesicular structure may be produced by adding to the hot viscid mass aforesaid a small quantity of bicarbonate or carbonate of soda, potassa, lime, or other alkali or alkaline earth, or by the use of any sulphide, sulphite, or other compound which will set free an acid vapor or gas under the above circumstances, and which in the act of escaping will inflate and render it frothy while in the process of cooling and hardening, whereby it becomes full of pores and vesicles. A like result, though less perfect in its operation, may be obtained by the rapid injection of air, steam, vapor of water, or any gaseous body into the hot viscid sulphate of alumina, the object being the production of the porous or vesicular condition of the mass when in the act of cooling or hardening.

Having now described my invention, what I claim as new, and desire to secure by Letters Patent, is—

1. The process herein described of manufacturing a porous material for paper-makers' use containing sulphate of alumina and sulphate of magnesia free from iron, and so neutral that it does not affect the color of the ultramarine-blue used in paper-making, substantially as described.

2. The process herein described of producing directly from an artificial hydrate of alumina a porous material for paper-makers' use, containing sulphate of alumina and sulphate of magnesia free from iron, and so neutral that it does not affect the color of the ultramarine-blue used in paper-making, substantially as described.

3. The process herein described of producing directly from an artificial hydrate of alumina a porous material for paper-makers' use, containing sulphate of alumina and sulphate of magnesia free from iron, and so neutral that it does not affect the color of the ultramarine-blue used in paper-making, the process consisting, essentially, in first dissolving artificial hydrate of alumina free from iron in sulphuric acid and water, then adding to the resulting hot fluid sulphate of alumina magnesia or carbonate of magnesia, then cooling the hot fluid mass till it begins to thicken, then adding bicarbonate of soda and stirring the same into the hot viscid sulphate of alumina and magnesia, to produce a porous or vesicular structure, and, finally, breaking the mass after it has sufficiently cooled into lumps of the desired size, as and for the purpose above set forth.

ROBERT A. FISHER.

Witnesses:
 HENRY T. DECHERT,
 OTIS EGAN.